Oct. 17, 1944.　　　S. N. KOULICHKOV　　　2,360,690
FLOATING PARTIAL DRY DOCK UNIT
Filed Dec. 27, 1943　　　3 Sheets-Sheet 1
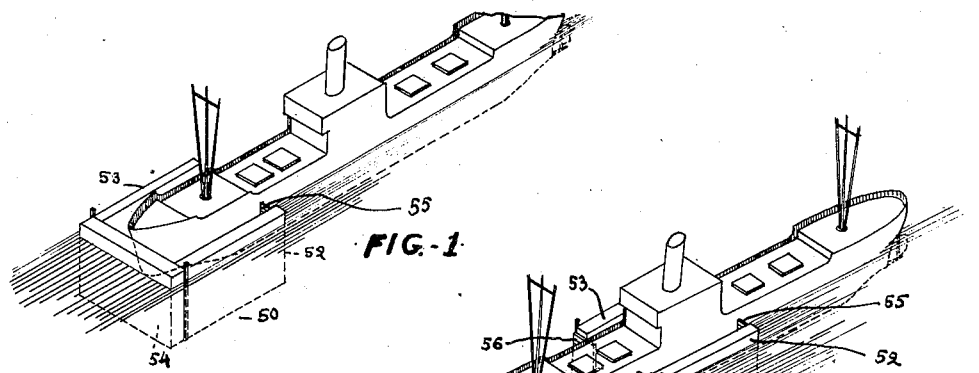
FIG.-1.
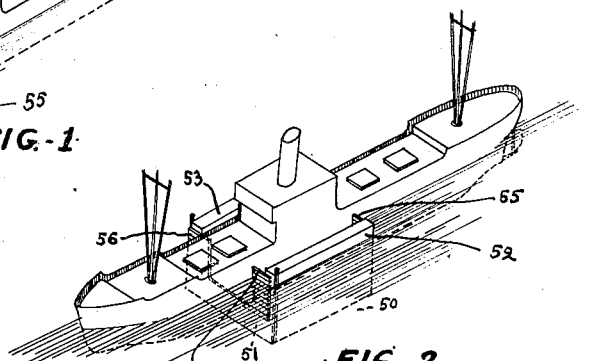
FIG.-2.
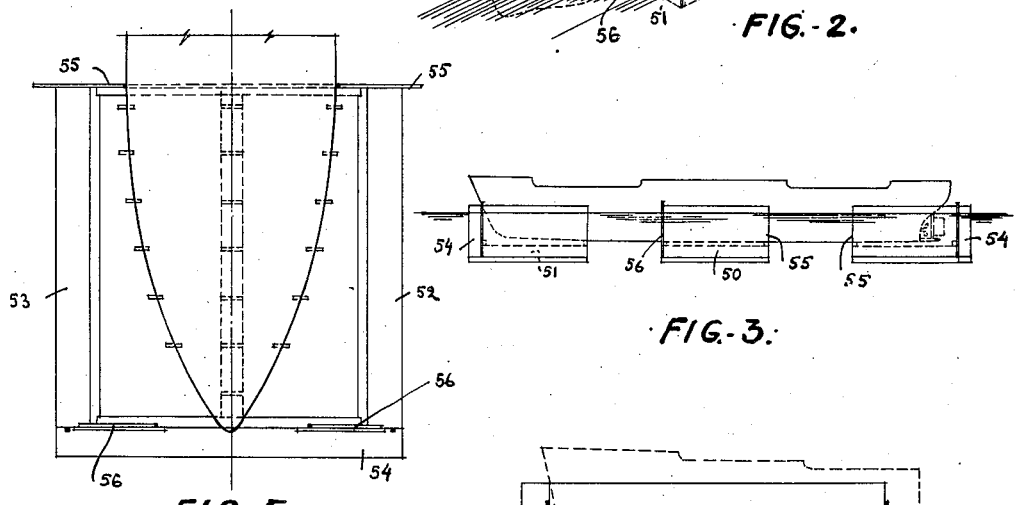
FIG.-3.
FIG.-4.
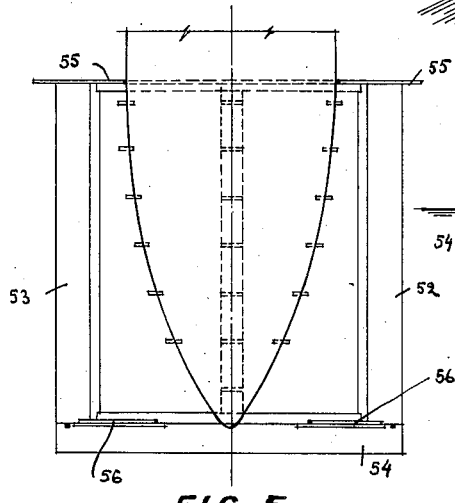
FIG.-5.
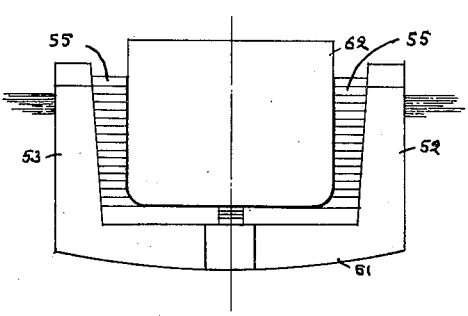
FIG.-6.
INVENTOR.
Serge N. Koulichkov Oct. 17, 1944.　　S. N. KOULICHKOV　　2,360,690
FLOATING PARTIAL DRY DOCK UNIT
Filed Dec. 27, 1943　　3 Sheets-Sheet 2
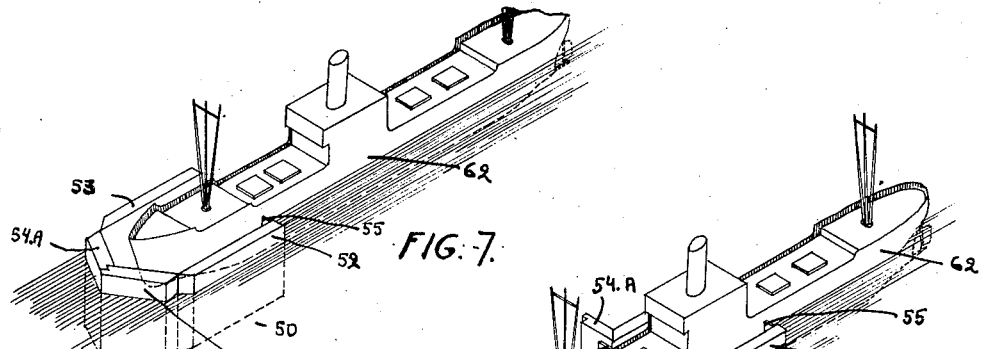
FIG. 7.
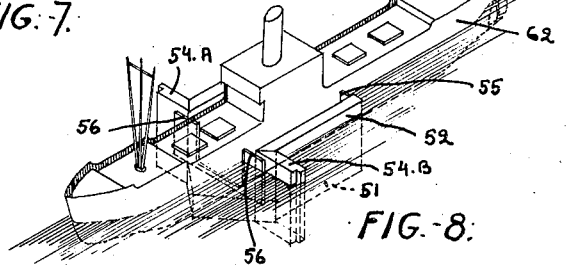
FIG. 8.
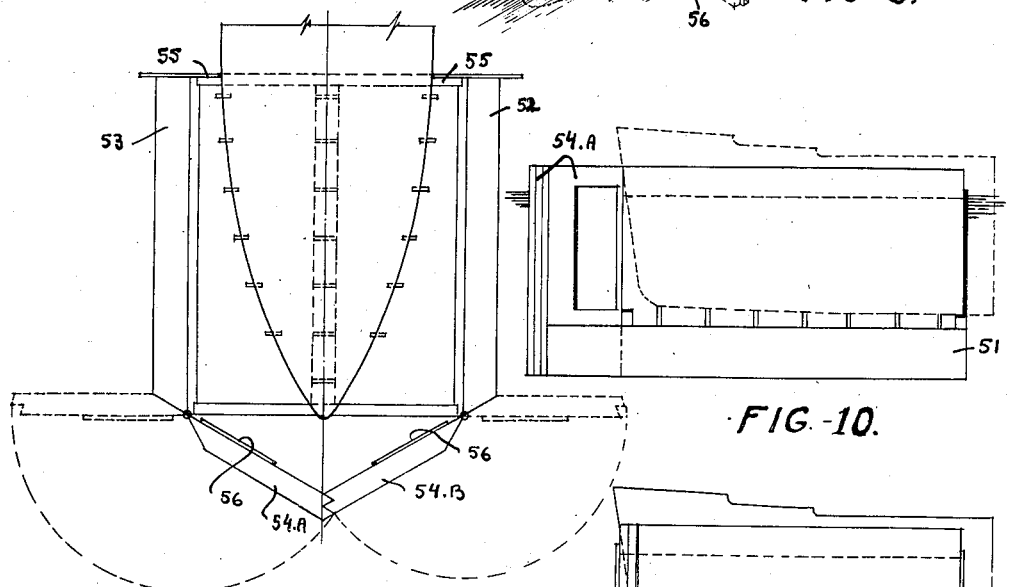
FIG. 9.
FIG. 10.
FIG. 11.
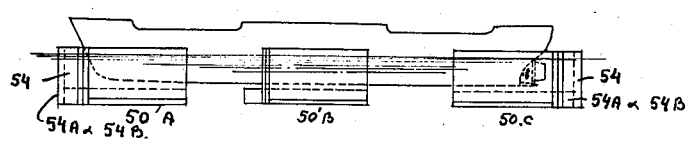
FIG. 12.
INVENTOR.
Serge N. Koulichkov Oct. 17, 1944. S. N. KOULICHKOV 2,360,690
FLOATING PARTIAL DRY DOCK UNIT
Filed Dec. 27, 1943 3 Sheets-Sheet 3
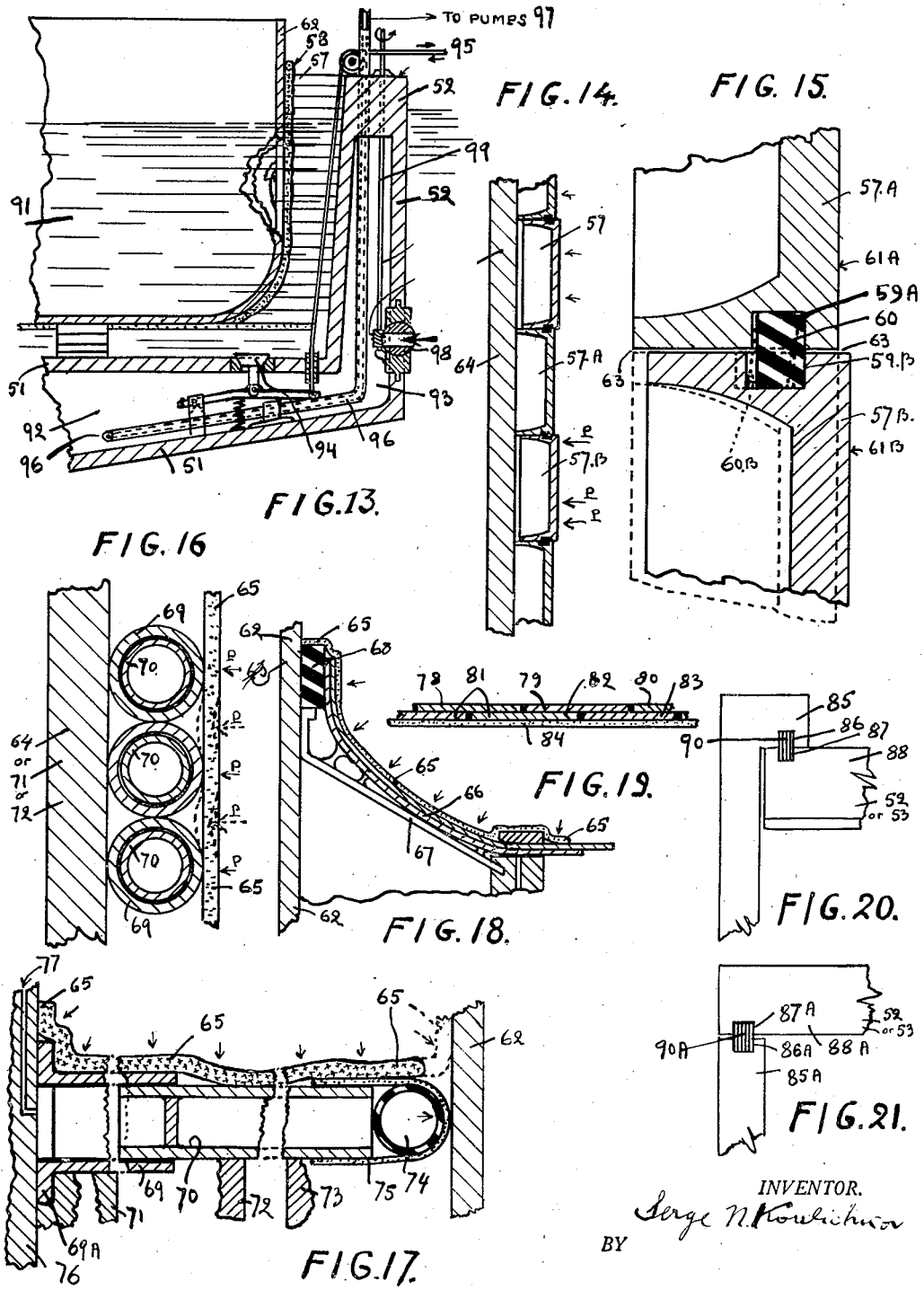
INVENTOR.
Serge N. Koulichkov
BY Patented Oct. 17, 1944

2,360,690

UNITED STATES PATENT OFFICE 2,360,690

FLOATING PARTIAL DRY DOCK UNIT

Serge N. Koulichkov, Beechhurst, Long Island, N. Y., assignor of thirty-five per cent to George A. Rubissow, New York, N. Y.

Application December 27, 1943, Serial No. 515,746

7 Claims. (Cl. 61—68)

This invention relates to a simple means for ship repair, which provides a floating partial dry-dock unit (section) of light construction, large enough to accommodate particular types of ships, destroyers, Liberty or Victory cargo ships, troop transports, tankers, etc., classified by tonnage or hull's shapes.

Primarily my floating partial dry-dock unit is not designed to raise the entire cargo ship from the water (as is conventionally done at present), but to take only part of the ship's buoyancy. On the other hand it may be used in the same manner as ordinary floating dry docks, only its lifting capacity will naturally be limited by its own size and strength. No difficulties are anticipated for servicing in customary ways, such crafts as submarines, mine sweepers, corvettes, tug boats, barges, etc.

Standardized simplicity, shortness of time and low cost of maintenance with available materials, will enable production of my floating dock unit in quantities for distribution all over the world, in every port along the route of our convoys or even for escorting the convoy itself.

At present, in order to repair a torpedo hole under the water line of the ship, it has to be brought to either a stationary or a floating dry dock. In the latter case, the ordinary floating dry dock has to be large enough to raise the entire ship out of water. When a sectional floating dry dock is used, it will be necessary to provide 5 or 6 sections of 3 to 4 thousands of tons capacity each in order to raise a medium size cargo ship. The same repair can be made by means of my partial floating dry dock unit without raising the damaged ship out of water and employing for the same purpose only one unit of very simple and light construction. Thus, so many times less of material and time will be required for the building of a floating, easily transportable repairing facility, or, in other words, so many times more units for repair can be built for the same effort.

Furthermore, my partial floating dry dock unit does not necessarily have to be fully equipped with power and pumping facilities, as it may use the power from the shore or from the ship to be serviced, if her machinery is not damaged. The pumping means should preferably be installed permanently on the unit.

All this proves the economical soundness of the new type of this repair facility. There is another point in favor of it, namely, the simple procedure of bringing my partial floating dry dock unit in operative position and the saving of time in flooding and de-watering of this single section.

There is still another advantage in the fact that less technical personnel is required to operate my partial floating dry dock unit. Any structural material—timber, steel, or concrete, can be used for the manufacture of my partial floating dry dock unit. The cost of maintenance and upkeep of a single unit during and after the war is much less in comparison with conventional floating dry docks for obvious reasons, as stated above. The self-docking arrangement for self-servicing is also provided for in my partial floating dry dock unit which will be described below.

My partial floating dry dock unit consists of a pontoon, two side walls, a movable gate (or gates) hinged or otherwise affixed on said side wall (or side walls), adjustable partition-sealing means mounted on said side walls, establishing a water-tight seal between the unit and the hull of the ship.

Other and auxiliary objects of this invention will be apparent to those skilled in the art from a reading of this specification and inspection of the accompanying drawings. Like references and like numbers wherever possible will be used to describe like elements on the various figures and in the description thereof.

In the drawings,

Figures 1 and 2 are diagrammatical side views in perspective of embodiments of units in accordance with this invention.

Figures 3 and 4 are diagrammatical side views of units in accordance with this invention.

Figure 5 is a diagrammatical plan view of one unit in accordance with this invention.

Figure 6 is a diagrammatical cross-sectional side-view of Figure 5.

Figures 7 and 8 are diagrammatical side views in perspective of embodiments of units in accordance with this invention.

Figure 9 is a diagrammatical plan view of one unit in accordance with this invention.

Figures 10, 11 and 12 are diagrammatical side views of units, according to this invention.

Figure 13 is a schematical side view partly in cross-section with parts broken out of another embodiment of this unit of this invention.

Figures 14, 15, 16, 17, 18 and 19 are schematical side views partly in cross-section with parts broken out of an adjustable partition used in combination with this invention.

Figures 20 and 21 are schematical plan views with parts broken out of the water-tight sealing means between the gates and side walls in accordance with this invention.

Several improvements on dry dock and coffer dams are known, in especial, those as described in United States Patents 259,218; 395,265; 326,985; 156,542; 932,719; 920,286; 590,147; 1,300,954; 2,291,078; 2,325,607; 2,291,077; 2,287,434; 1,632,491; 1,474,336; 1,372,394; 125,873.

In U. S. patent of Reinhardt, #932,719, is shown a ship-repair apparatus embracing a portion of a ship to be repaired and providing magnetic and flexible bands, but it does not provide any fixed gate or any mobile gate. Hence it cannot be used as a universal apparatus able to also repair the stern or the bow of a ship as can my floating partial dry dock unit.

The U. S. Patents 156,542 of Cox, 326,985 of Howes, and 259,218 of Sanderson, provide a coffer-dam with a fixed gate, but do not have any movable gate, nor any adjustable partitions on both rear and front ends of the coffer dam, as does my invention, hence none of these can be employed for universal use.

The U. S. patent of Kirkham, 418,726, consists "in part of an opening at one or two of their sides" (lines 33–34, page 1) "arranged to be closed wholly by a series of arms pivoted to the side of the dam, or wholly by gates hinged to the sides . . ." (lines 103–104, page 1 to line 9, page 2). Thus, a coffer dam such as this is not universal and does not offer the features offered by my invention, particularly as its gates are detachable and have no hollows, therefore cannot be used for self-docking and cannot be separated from the coffer dam.

In my invention, on Figures 1 to 12, is shown a universal floating dry dock unit having pontoon 51, side walls 52 and 53, a single floating or buoyant gate 54 or two floating or buoyant gates 54A and 54B, and provided with adjustable partitions 55—55 and 56—56 on both front and rear ends of said side walls 52 and 53.

The unit 50 shown on Figures 1, 5, 7, 9 and 10, is mounted on the bow—on Figures 2 and 8 it is mounted amidship.

The unit is self-docking; the gate 54 or gates 54A and 54B may be each provided with chambers which are sealed watertight. Such gate 54 or gates 54A and 54B should preferably be separate and apart from the side walls and partitions in which case they may be mounted on the pontoon and side walls by means of locks or chains and/or adjustable hinges, hooks, etc., not shown on the drawings, being self-evident. If desired, one of the sides of gate 54 may be mounted or attached on the side wall 52 or 53 by means of suitable locks, chains, hinges or pivots, or both gates 54A and 54B may be similarly mounted or attached—one on side wall 52 and the other on wall 53 or on the pontoon 51.

Such gate or gates are thus self-floating and may be provided with pipes and other means for pumping out water from the hollows, and with flooding valve equipment and other suitable dewatering valves, means, etc. Such gate or gates may easily be separated from the pontoon and side walls of the unit and floated below the ponton or open side of side wall, and used for self-docking.

When floated under the part of the hull of the ship which may need repairing, the gate 54 or gates 54A and 54B may be swung outward as shown on Figures 8 and 9, in dotted line, or temporarily removed, as shown on Figure 2.

On Figures 3, 4, 5, 6, 11 and 12 are shown various positions of the unit on the hull of the ship, as the case may be.

One of the main aspects of this invention comprises the provision of means to seal substantially watertight the adjustable partitions 55—55 and 56—56 against the ship's hull 62. Such sealing may be accomplished by suitable sealing means, such as shown on Figures 13, 14, 15, 16, 17, 18 and 19.

Figures 13, 14 and 15 show a plurality of channels or blocks or bars, or rods, rails, traverses or members 57 or 57A and 57B, mounted slidably by suitable guide means such as grooves, guiding-walls, etc. These are not shown on the drawings being self-explanatory.

Such members 57 may be provided with grooves 59A and 59B in which a preferably flexible or resilient water-tightening member such as a bar made of metal, wood, hard rubber, plastic, etc., 60 may be inserted, the groove 59A being at a shorter distance from surface 61A than the groove 59B from the surface 61B. Thus, the pressure of water when the member 57B is pressed against Figures 14 and 15 will deform or incline by shearing action the insert 60 and thereby seal watertight the passage 63, as shown in dotted line 60B on Figure 15.

The members 57—57A—57B may all be able to press directly or indirectly against the support or guiding means 64, Figure 14, and should preferably be provided on their free ends for water-tightening purposes, with a gasket 58, Figure 13, made of suitable compressible material, such as a textile, jute, cotton, rubber, rubber tire, pneumatic or air-inflated cushion or tube, etc.

If desired, a flexible water-tight apron may be provided outside on the surfaces 61A and 61B, etc., of the members 57A, 57B, etc. This is not shown on the drawings being self-explanatory.

The apron 65, Figure 18, may also be mounted on flexible bars or sheets 66, mounted on rigid supports 67; a watertight elastic or resilient gasket 68 should preferably be inserted between the free end of the flexible bar or sheet 66 and the hull 62.

On Figures 16 and 17, a plurality of telescopic pipes 69—70 are shown. Only two are shown on the drawings. These pipes may be slidably mounted one in the other and covered with an apron 65 as a watertight shield. Additionally, the free end of pipe 70 may be provided with a gasket or air-tubing 74 covered, if desired, with a cover 75. The telescopic action of tubes 69—70 may be controlled by a fluid or air pressure through a channel 77 provided in a support 76 on which the pipe 69 or its base 69A (if any) may be mounted. The plurality of pipes 69—70 may be mounted on common guide means or supports 71—72—73, or more.

The adjustable partitions may also be made from a plurality of overlapping flexible sheetings 78—79—80—81—82—83 provided with an apron 84, as shown on Figure 19, in rows. Only a double row is shown, but a plurality may be used.

There is another great advantage in the use of my unit—it is the self-docking for maintenance.

Using its own floating gate as a buoyancy jack and floating alternately the corresponding parts of the unit described, the structure can be partially raised out of the water, and the underwater part of the unit can be scraped or painted.

In turn, the floating gate can itself be docked for repair on the pontoon of the floating partial dry dock unit described herein, in the same way as it may dock a small vessel in conventional manner.

Another way of self-docking this unit, is by tipping its floating gate in horizontal position and lifting the floating unit on the side of the floating gate.

The gates, being buoyant (following the corresponding buoyancy of this unit) do not exert any great strain on hinges, and therefore the latter may be of light design.

The hinges may be either of water-tight construction or the canvas apron from the outside may provide the seal.

The hinge end of the gates is so designed as to allow each gate to swing out and rest in right angle to the wing walls. This provision is necessary in order to bring the adjustable partitions into operation position as this is assembled on the inside face of the gate.

This floating unit as herein described with a hinged gate has certain advantages in comparison with other types. Having the pontoon on the side of the gate shaped to a point, it is better adapted for seagoing; it can be more readily towed by the ship in convoys. It is also better adapted to the bow end of a ship, thus reducing the amount of entrapped water, and provides an auxiliary transverse rigidity of the floating dry dock unit.

This particular type of floating unit can be especially adapted for convoy duties, whereas the unit with the floating gate may be used in port.

The gates 85 or 85A, Figures 20 and 21, may be provided with groove 86 or 86A to register the groove 87 or 87A of the side wall 88 or 88A. The insert 90 or 90A may be made of a resilient or flexible material or it may be either a plurality of wooden boards which under outside water pressure become inclined along the shearing axis, thus providing a water-tight seal, or the insert may be a tubular member inflated with fluid or air under pressure.

The water from the damaged part of the hull 91, Figure 13, may be pumped out by simple gravity flow from 91 into the chambers 92 and 93 of pontoon 51 and side walls 52 or 53 on opening the de-watering valve 94 by suitable mechanical or flexible means 95.

The pumping out of water from the pontoon and/or the side walls may be controlled by a pipe 96 or a plurality of pipes, leading to pumps 97. This is not shown on the drawings.

The flooding of water from the sea into the hollow 93 or hollows 93 and 92 may be controlled by a valve 98 controlled by suitable means such as 99 (for example).

Any combination of de-watering and/or pumping out and/or flooding means may be used.

The units described herein may be made of any material, such, for instance, as metal alloys—steel, iron, aluminum, copper, bronze—or from wood, plywood, plastic, and/or any mixture thereof, and in particular from reinforced concrete or laminated concrete, or poly-concrete, reinforced concrete being very handy and economical in use.

Having now particularly described and ascertained the nature of the said invention and the manner in which it is to be performed, I declare that what I claim is:

1. A universal, self-docking, floating partial dry-dock unit, for repair of a ship's stern, bow and any part amidship, comprising a pontoon, two side walls provided on said pontoon, a movable, separate and detachable buoyant gate provided on the rear end of said unit and having at least one chamber tightly sealed against inlet of water, means to attach said gate to said pontoon and said side-walls, a first means to seal substantially water-tight said gate with said side-walls and said pontoon, a first and second pair of adjustable partitions forming substantially a watertight curtain, said partitions provided respectively on front and rear ends of said unit, the outer edges of said partitions being mounted on said side-walls (and partly on said pontoon), the inner edges of said partitions being adjustable and contacting a part of the hull of said ship on which said unit is to be mounted, means to adjust said inner edges of said partitions to fit the contour of said part of said hull, second means to seal substantially water-tight said inner edges of said partitions with said part of said hull, whereby said unit may be universally used for repair of a ship's bow, stern, or any part amidship.

2. A universal, self-docking, floating partial dry-dock unit for repair of a ship's stern, bow, and any part amidship, comprising, a pontoon, two side-walls provided on said pontoon, two movable separate buoyant gates provided on both sides of the rear end of said unit and each said gate having at least one chamber tightly sealed against inlet of water, means to attach said gates to said pontoon and said side-walls, a first means to seal substantially water-tight said gate with said side-walls and said pontoon, a first and second pair of adjustable partitions provided respectively on front and rear ends of said unit, the outer edges of said partitions being mounted on said side-walls and partly on said pontoon, the inner edges of said partitions being adjustable and contacting a part of the hull of said ship on which said unit is to be mounted, means to adjust said inner edges of said partitions to fit the contour of said part of the said hull, second means to seal substantially water-tight said inner edges of said partitions with said part of said hull, whereby said unit may be universally used for repair of a ship's bow, stern, or any part amidships.

3. A unit as set forth in claim 1 wherein said gate is at least partly hinged on one of said side-walls.

4. A unit as set forth in claim 1 wherein the said gate is at least partly hinged on said pontoon.

5. A unit as set forth in claim 2 wherein each of said gates is at least partly hinged on said side-walls.

6. A unit as set forth in claim 2 wherein the said gate is at least partly hinged on said pontoon.

7. A unit as set forth in claim 2 wherein the said adjustable partitions are composed of a plurality of adjustably mounted telescopic pipes, one end of which pipes are rigidly attached to a support provided therefor, the other end of said pipes being provided with a gasket interposed in between said pipes and said part of said hull, an apron made of flexible waterproof material covering the outer surface of said pipes.

SERGE N. KOULICHKOV.